(No Model.) 2 Sheets—Sheet 2.
W. PASCHAL.
FOLDING POULTRY CRATE.
No. 451,069. Patented Apr. 28, 1891.
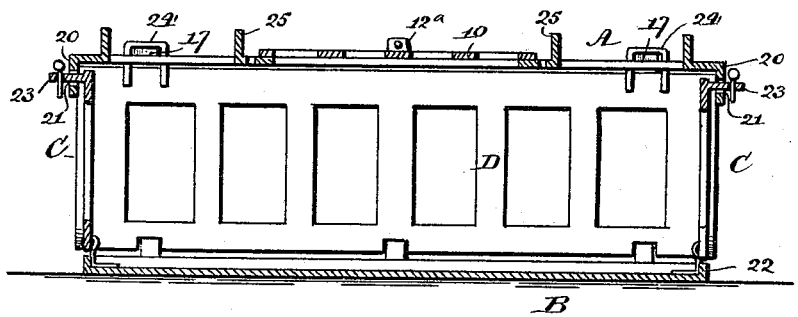
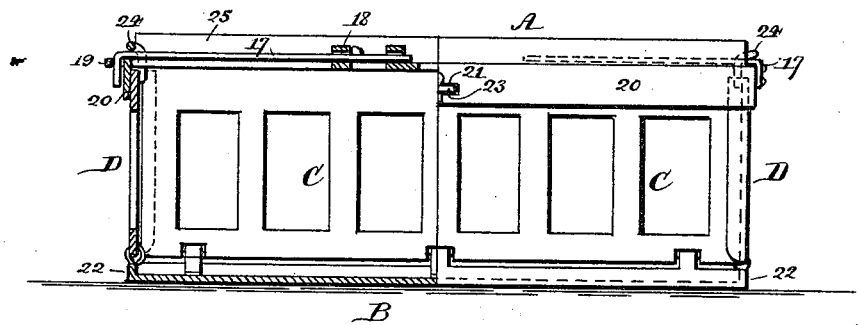
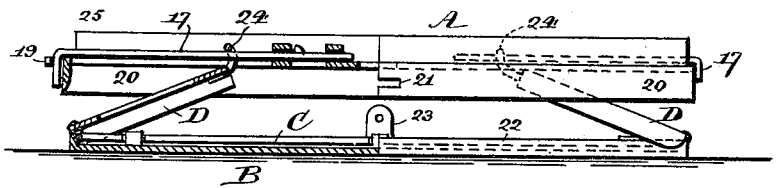
WITNESSES:
H. H. Walker
C. Sedgwick
INVENTOR:
W. Paschal
BY Munn & Co.
ATTORNEYS

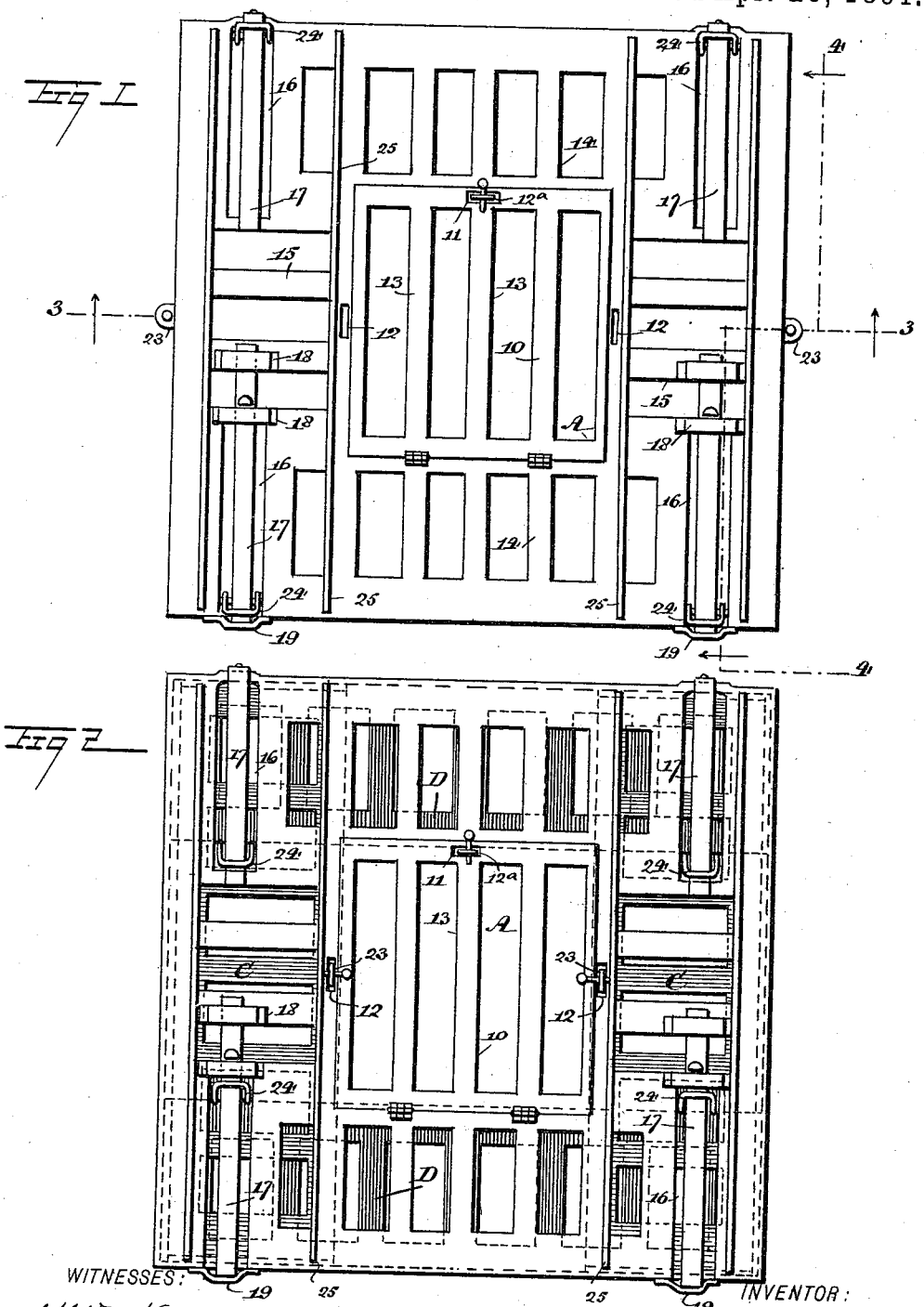

UNITED STATES PATENT OFFICE.

WILLIAM PASCHAL, OF RUTHERFORD, TENNESSEE.

FOLDING POULTRY-CRATE.

SPECIFICATION forming part of Letters Patent No. 451,069, dated April 28, 1891.

Application filed February 14, 1891. Serial No. 381,424. (No model.)

*To all whom it may concern:*

Be it known that I, WILLIAM PASCHAL, of Rutherford, in the county of Gibson and State of Tennessee, have invented a new and Improved Folding Poultry-Crate, of which the following is a full, clear, and exact description.

My invention relates to an improved folding poultry-crate, and has for its object to provide a crate especially adapted for the transportation of poultry and other live stock, and which may also be employed for other purposes, and to so construct the crate that it will have no loose or unconnected parts.

A further object of the invention is to provide a crate capable of being folded flat when not in use to facilitate its transportation, and which may be conveniently expanded and placed in proper shape to receive its contents.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a plan view of a crate when expanded and in position to receive its contents. Fig. 2 is a similar view of the crate when folded for return transportation. Fig. 3 is a central vertical section taken upon the line 3 3 of Fig. 1. Fig. 4 is partly a side elevation and partly a section taken practically at a right angle to the section shown in Fig. 3 and upon the line 4 4 of Fig. 1; and Fig. 5 is a partial side elevation and sectional view of the crate, the crate being shown in a partially-closed position.

The crate consists of a top A, a bottom B, and sides C and D. The top A is preferably made of one piece of sheet metal, and is provided with a central opening closed by a door 10, hinged at one side, the said door being provided with a slot 11 in one side, adapted to receive a hasp 12ª, attached to the crate. The door has produced therein a series of openings extending through from one side to the other, and forming thereby a number of bars 13, and the plate constituting the cover or top is also provided with a series of openings around its central opening, the said openings being so located as to form longitudinal bars 14 and transverse bars 15.

Near the corners of the top plate longitudinal openings 16 are produced, which openings extend nearly to the edges of the cover, and longitudinally across the openings tongues 17 are located, the tongues upon one side of the cover-plate being rigidly secured at their extremities to said plate, but the tongues at the opposite side are movable, being capable of sliding in keepers 18, as shown in Figs. 1 and 2. The movable tongues at their outer ends are preferably bent downward to enter staples or keepers 19, attached to the margin of the plate.

The marginal edges of the cover-plate are bent downward at a right angle, forming flanges 20, as best shown in Fig. 3, and in opposite flanges 20 openings 21 are produced, as is also best shown in Fig. 3. By thus constructing the cover-plate of the crate the contents thereof are rendered visible, and an ample supply of air is admitted to the interior.

The bottom B of the crate is made solid, and is also provided with an upwardly-extending marginal flange 22. The sides C and D are hinged to the flanged portion of the bottom in any suitable or approved manner, the said sides being adapted to fold inward. The sides C are provided at or near the central portion of their upper edges with a hasp 23 or its equivalent, the hasps being adapted when the crate is in its expanded position to pass through the openings 21 in the cover-plate flange, and cotter-pins, seals, or equivalent devices are employed to lock the said sides C to the cover-plate.

The sides D are directly connected with the cover-plate, and this connection is effected by securing to the upper surfaces of the side pieces staples or loops 24, which slide upon the tongues 17 of the cover-plate. The sides D at their ends are preferably bent to angular shape, whereby they overlap the ends of the side pieces C.

When the contents of the crate have been removed therefrom, the crate is knocked down or closed for return transportation by removing the fastening devices from the hasps 23, whereupon the sides C may be pressed inward upon the bottom. The opposite sides D are then also pressed inward, and as they drop or fold upon the bottom of the crate they carry the top plate down with them. The staples or loops 24 of said side pieces as they drop travel upon the tongues 17 from their outer to their inner ends, as best shown in Fig. 2. When the crate is in this folded position, which is partially shown in Fig. 5, the flange of the top plate conceals the margins of the bottom. The fastening devices taken from the hasps 23 are then passed through the hasps, as the latter, when the crate is folded, project outward through the openings 12 of the cover-plate. The door 10 is also held in position by the hasp 12$^a$, attached to the cover-plate, passing through the opening 11 in the door, the said hasp being also provided with a fastening device.

The crate is expanded by withdrawing the fastening devices from the hasps 23 and drawing the cover-plate upward from the bottom, whereupon the sides D are brought to a vertical position. The sides C are then elevated and secured to the cover in the manner heretofore described. The object of making two of the tongues 17 movable is to facilitate the cleansing of the crate, as by sliding the tongues back they are disengaged from the loops 24 of one of the sides D, whereupon the said side may be disengaged from the top plate and all of the sections may be laid horizontally upon any convenient support.

The sides D and D are barred or provided with a series of openings for purposes of ventilation and also to lighten the crate, and the top plate is preferably strengthened by ribs 25.

Having thus described my invention, I claim as new and desire to secure by Letters Patent—

1. As an improved article of manufacture, a folding poultry-crate consisting of a bottom section, a top section provided with openings and with tongues crossing the openings, and side sections hinged to the bottom, two opposite side sections being provided with attached loops through which the tongues pass, as and for the purpose specified.

2. A folding poultry-crate consisting of a bottom section, a barred upper or cover section provided near each corner with a tongue, the tongues upon one side being rigid and upon the opposite side movable, and side sections hinged to the bottom, two of which side sections are provided with loops through which the tongues pass, as and for the purpose specified.

3. A crate of the character described, consisting of a bottom section, a barred top section provided with a door or gate and tongues near opposite corners, the tongues upon one side being rigid and at the other side movable, a flange projected downward from the margin of the top section, and side sections hinged to the bottom, two of which side sections are angular in cross-section at their extremities and two of said side sections being provided with attached loops to receive the tongues of the top section, substantially as and for the purpose specified.

WILLIAM PASCHAL.

Witnesses:
H. W. WILLIAMS,
ROBT. BARNER.